United States Patent
Hwang et al.

(10) Patent No.: US 7,830,971 B2
(45) Date of Patent: Nov. 9, 2010

(54) APPARATUS AND METHOD FOR DETECTING ADVANCED GCL SEQUENCE IN WIRELESS COMMUNICATION SYSTEM

(75) Inventors: Hyun-Gu Hwang, Daejon (KR); Hyeong-Jun Park, Daejon (KR)

(73) Assignees: Electronics and Telecommunications Research Institute, Daejeon (KR); Samsung Electronics Co., Ltd., Suwon-si, Gyeonggi-do (KR)

( * ) Notice: Subject to any disclaimer, the term of this patent is extended or adjusted under 35 U.S.C. 154(b) by 985 days.

(21) Appl. No.: 11/645,658

(22) Filed: Dec. 27, 2006

(65) Prior Publication Data

US 2008/0080643 A1    Apr. 3, 2008

(30) Foreign Application Priority Data

Sep. 29, 2006  (KR) .................. 10-2006-0095785

(51) Int. Cl.
| | |
|---|---|
| H04K 1/10 | (2006.01) |
| H04L 7/00 | (2006.01) |
| H03K 9/00 | (2006.01) |
| H04W 4/00 | (2009.01) |

(52) U.S. Cl. .................. 375/260; 375/371; 375/316; 370/331

(58) Field of Classification Search .......... 375/260, 375/371, 316; 370/331
See application file for complete search history.

(56) References Cited

U.S. PATENT DOCUMENTS

| | | | |
|---|---|---|---|
| 5,676,672 A | * | 10/1997 | Watson et al. ............... 606/120 |
| 5,703,970 A | * | 12/1997 | Atashroo .................... 382/278 |
| 2003/0198310 A1 | | 10/2003 | Fanson et al. |
| 2005/0135230 A1 | * | 6/2005 | Yu et al. ..................... 370/210 |
| 2005/0226140 A1 | | 10/2005 | Zhuang et al. |
| 2006/0039451 A1 | * | 2/2006 | Zhuang et al. ............. 375/145 |
| 2006/0140292 A1 | * | 6/2006 | Blasco Claret et al. ...... 375/260 |
| 2007/0036239 A1 | * | 2/2007 | Ma et al. .................... 375/316 |
| 2007/0237113 A1 | * | 10/2007 | Akita et al. ................ 370/331 |

FOREIGN PATENT DOCUMENTS

| | | |
|---|---|---|
| JP | 09/298523 | 11/1997 |
| JP | 2004-023405 | 1/2004 |
| KR | 1020030063665 | 7/2003 |
| KR | 1020070076372 | 7/2007 |
| WO | 2006/023423 | 3/2006 |

OTHER PUBLICATIONS

Office Action for Korean Application 10-2006-0095785.
Notice of Allowance for Korean Patent App. 10-2006-0095785.

* cited by examiner

*Primary Examiner*—Mohammad H Ghayour
*Assistant Examiner*—Sarah Hassan
(74) *Attorney, Agent, or Firm*—Lowe Hauptman Ham & Berner LLP (57) ABSTRACT

An apparatus and method for detecting a GCL sequence using a magnitude and a sign of a real part of a I/FDFT output except an imaginary part in a wireless communication system. The apparatus includes: a modified inverse/forward discrete fourier transform (I/FDFT) processing unit for enabling that the GCL sequence class u is detected with only a real part; a real value selecting unit for selecting real parts from the output of the I/FDFT processing unit; and a maximum value detecting unit for detecting a maximum value among magnitudes of the selected real parts having a positive sign from the real value selecting unit.

12 Claims, 4 Drawing Sheets

APPARATUS AND METHOD FOR DETECTING ADVANCED GCL SEQUENCE IN WIRELESS COMMUNICATION SYSTEM

FIELD OF THE INVENTION

The present invention relates to an apparatus for detecting a GCL sequence in a wireless communication system; more particularly, to an apparatus for detecting a GCL sequence using magnitudes and signs of real parts of an inverse discrete fourier transform (IDFT) outputs except imaginary parts thereof in order to improve signal to noise ratio (SNR) and to effectively detect a GCL sequence with less computation amount in a wireless communication system.

DESCRIPTION OF RELATED ART

In general, a generalized chirp-like (GCL) sequence has been used as a known reference signal in digital wireless communication and has been used for cell search in various next-generation mobile communication schemes such as 3G Evolution.

At first, a GCL sequence will be described.

Class-u GCL sequence S of length N are defined as Eq. 1.

$$S_u = (a_u(0)b, a_u(1)b, \ldots, a_u(N-1)b) \qquad \text{Eq. 1}$$

In Eq. 1, b is any complex scalar of unit amplitude, and $a_u(k)$ is shown in Eq. 2.

$$a_u(k) = \exp\left(-j2\pi u \frac{k(k+1)/2 + qk}{N}\right) \qquad \text{Eq. 2}$$

In Eq. 2, u(=1, 2, ..., N−1) denotes the "class" of the GCL sequence, k(=0, 1, ..., N−1) denotes the indices of the entries in a sequence, and q is any integer.

A communication system transmits one GCL sequence class signal and detects it instantly, or transmits a plurality of GCL sequence class signals sequentially, stores them in a buffer, and detects them sequentially. Furthermore, a type of predetermined combination can be determined using information of predetermined sequential combination.

In a communication system, N in Eq. 1 or Eq. 2 is assigned with a prime number to allow the GCL sequence to have good autocorrelation and cross-correlation, and b is assigned with 1 to simplify a computation operation without the change of major characteristics.

If wireless resources of a communication system are insufficient, a GCL sequence is shortened by removing a predetermined portion from a rear part or a front part of a GCL sequence having a length N. If wireless resources are sufficient, the GCL sequence may be extended as long as a predetermined length. Although the GCL sequence is shortened or extended, the major characteristics of the GCL sequence do not change at all.

Figure 1:
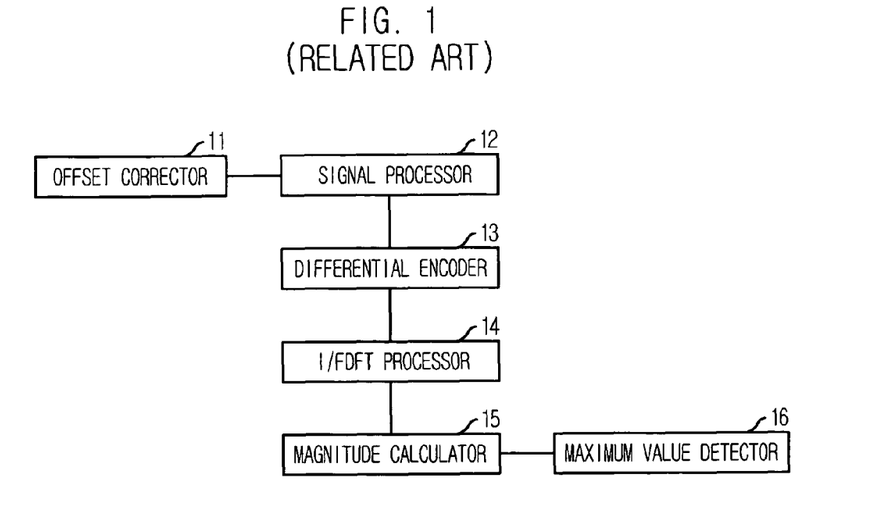
FIG. 1 is a block diagram illustrating a GCL sequence detecting apparatus of a wireless communication system in accordance with the related art.

FIG. 1 is a block diagram illustrating a GCL sequence detecting apparatus of a wireless communication system in accordance with the related art.

Referring to FIG. 1, the GCL sequence detecting apparatus according to the relate art includes an offset corrector 11, a signal processor 12, a differential encoder 13, an I/FDFT processor 14, a magnitude calculator 15, and a maximum value detector 16.

The offset corrector 11 corrects a time offset value and a frequency offset value of a received signal.

The signal processor 12 extracts a GCL sequence from a corrected signal outputted from the offset corrector 11. For example, in case of a code division multiple access (CDMA) communication system, the GCL sequence is extracted from the corrected signal by performing a dispreading operation. In case of orthogonal frequency division multiplexing (OFDM) communication system, the GCL sequence is extracted from the corrected signal by performing an inverse fast fourier transform (IFFT) on the corrected signal.

The differential encoder 13 performs a differential encoding on the extracted GCL sequence Y(m) having noise outputted from the signal processor 12 using a characteristic that a phase difference of a GCL sequence continuously increases as much as a predetermined constant amount. Such a different encoding can be expressed as Eq. 3 to Eq. 6.

$$Z(m) = Y^*(m)Y((m+1)_{mod\,N}),$$

$$m = 0, 1, \ldots, N-1 \qquad \text{Eq. 3}$$

$$Z(m) = Y^*(m)Y((m+1)_{mod\,N})/abs(Y^*(m)Y((m+1)_{mod\,N}))$$

$$m = 0, 1, \ldots, N-1 \qquad \text{Eq. 4}$$

$$Z(m) = Y((m+1)_{mod\,N})/Y(m),$$

$$m = 0, 1, \ldots, N-1 \qquad \text{Eq. 5}$$

$$Z(m) = (Y((m+1)_{mod\,N})/Y(m))abs(Y((m+1)_{mod\,N})/Y(m))$$

$$m = 0, 1, \ldots, N-1 \qquad \text{Eq. 6}$$

In Eq. 3 to Eq. 6, $Y^*(m)$ denotes a conjugate complex number of Y(m), and abs ( ) denotes an absolute value. Eq. 3 and Eq. 5 have information on a magnitude and phase difference between received signals. Eq. 4 and Eq. 6 have the phase difference information only.

When a predetermined portion is removed from the rear part of the GCL sequence, m in Z(m) has values of 0, 1, 2, ..., $N_t-2$. Herein, $N_t$ denotes a length of a GCL sequence with a predetermined portion removed from the rear part thereof.

If all entries of GCL sequence are received through the same channel without noise, Eq. 5 can be expressed as Eq. 7.

$$Z(m) = Y((m+1)_{mod\,N})/Y(m) \approx \exp\left(-j2\pi u \frac{m+1+q}{N}\right), \qquad \text{Eq. 7}$$

$$m = 0, 1, \ldots, N-1$$

If all entries of GCL sequence are received through the same channel without noise, Eq. 3 can be expressed similar to Eq. 7 like as Eq. 7 with information about channel intensity.

If all entries of GCL sequence are received through the same channel without noise, a class u can be detected based on two entries of GCL sequence.

Since noise is generally added into GCL sequences, the I/FDFT processor 14 perform an inverse discrete fourier transform (IDFT) operation. If the numerator and the denominator in Eq. 5 are switched, an N-point forward discrete fourier transform (FDFT) operation is performed. The N-point FDFT operation is expressed as Eq. 8.

$$z(n) = \sum_{k=0}^{N-1} Z(k)\exp\left(\frac{j2\pi nk}{N}\right), \qquad \text{Eq. 8}$$

$$n = 0, 1, \ldots, N-1$$

If all entries of GCL sequence are received through the same channel without noise, Eq. 9 can be obtained from Eq. 7 and Eq. 8 when n=u.

$$z(u) \approx N \exp\left(-j2\pi u \frac{q+1}{N}\right) \quad \text{Eq. 9}$$

On the contrary if N is prime number and the value of class is not u, z(n) would have a very small value due to the characteristics of GCL sequence. Therefore, the magnitude calculator 15 calculates a magnitude by squaring a real part and an imaginary part of the result outputted from the I/FDFT processor 14, adding the squaring results, and calculating a root thereof.

If the noise is not included in channel, z(n) has the maximum value when n=u.

Therefore, the maximum value detector 16 detects the maximum magnitude among N magnitudes of z(n) in order to detect GCL class u.

Since the conventional GCL sequence detecting apparatus of a wireless communication system uses the magnitude of the IDFT output including both the real part and the imaginary part to detect the GCL sequence, both real part and the imaginary part are influenced by the noise, and it takes longer time to detect the GCL sequence due to complicated calculation procedure.

SUMMARY OF THE INVENTION

It is, therefore, an object of the present invention to provide an apparatus for detecting a GCL sequence using a magnitude and a sign of a real part of an inverse discrete fourier transform (IDFT) output except an imaginary part thereof in order to receive less influence from noise and to effectively detect GCL sequence with less computation amount in a wireless communication system.

It is another object of the present invention to provides an apparatus for detecting a GCL sequence effectively according to a channel condition of a wireless communication system by measuring the power of a received signal and using a magnitude and a sign of a real part of an IDFT output except an imaginary part thereof, or the magnitude of the IDFT output according to the measured power.

Other objects and advantages of the present invention can be understood by the following description, and become apparent with reference to the embodiments of the present invention. Also, it is obvious to those skilled in the art to which the present invention pertains that the objects and advantages of the present invention can be realized by the unit as claimed and combinations thereof.

In accordance with an aspect of the present invention, there is provided an apparatus for detecting a generalized chirp-like (GCL) sequence of a wireless communication system, including: a modified inverse/forward discrete fourier transform (I/FDFT) processing unit for enabling that the GCL sequence class u is detected with only a real part; a real value selecting unit for selecting real parts from the output of the modified I/FDFT processing unit; and a maximum value detecting unit for detecting a maximum value among magnitudes of the selected real parts having a positive sign from the real value selecting unit.

In accordance with another aspect of the present invention, there is provided an apparatus for detecting a generalized chirp-like (GCL) sequence of a wireless communication system, including: a power measuring unit for measuring a power of a received signal; a modified inverse/forward discrete fourier transform (I/FDFT) processing unit for enabling that the GCL sequence class u is detected with only a real part; a controlling unit for transferring an output value from the modified I/FDFT processing unit to a real value selecting unit if the measured power is larger than a predetermined threshold, and transferring the output value from the modified I/FDFT processing unit to a magnitude calculating unit if the measure power is not larger than the predetermined threshold; a real value selecting unit for selecting real parts from the output value from the controlling unit; a magnitude calculating unit for calculating a magnitude by squaring a real part and an imaginary part of the output value transferred from the controlling unit, adding the squaring results, and calculating a root of the adding result; and a maximum value detecting unit for detecting a maximum value among magnitudes of the selected real parts having a positive sign from the real value selecting unit or from the calculated magnitudes from the magnitude calculating unit.

In accordance with further still another aspect of the present invention, there is provided a method for detecting a generalized chirp-like (GCL) sequence of a wireless communication system, including the steps of: a) performing the modified I/FDFT operation enabling that the GCL sequence class u is detected with only a real part; b) real parts from the result of performing the modified I/FDFT operation; and c) detecting a maximum value among magnitudes of the real parts having a positive sign from the selected real values.

In accordance with further still another aspect of the present invention, there is provided a method for detecting a generalized chirp-like (GCL) sequence of a wireless communication system, comprising the including steps of: a) measuring a power of a received signal; b) performing the modified I/FDFT operation enabling that the GCL sequence class u is detected with only a real part; c) selecting real parts from the result of performing the modified I/FDFT operation and detecting a maximum value among magnitudes of the selected real parts having a positive sign if the measured power is larger than a predetermined threshold; and d) detecting a maximum value after calculating magnitudes by squaring a real part and an imaginary part from the result of performing the modified I/FDFT operation, adding the squaring results, and calculating a root of the adding result if the measured power is not larger than the predetermined threshold.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 2:
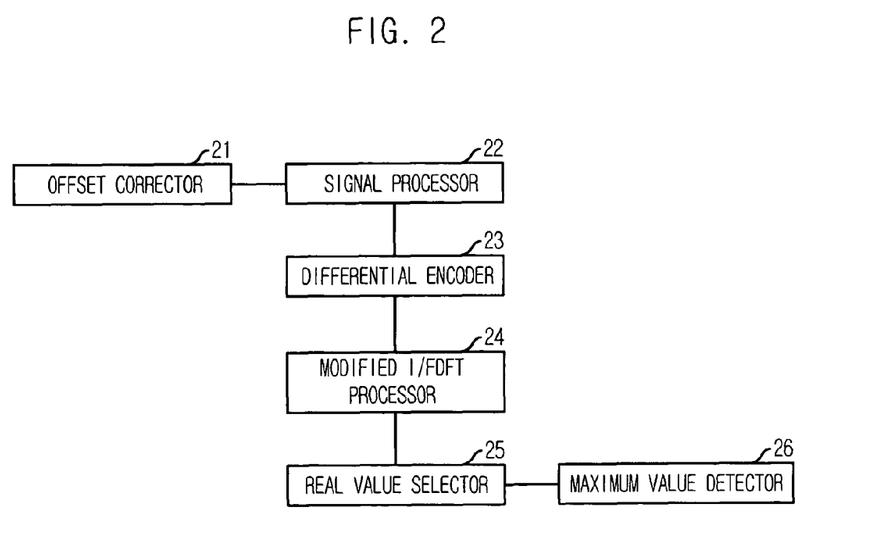
FIG. 2 is a block diagram illustrating a GCL sequence detecting apparatus of a wireless communication system in accordance with an embodiment of the present invention.

FIG. 2 is a block diagram illustrating a GCL sequence detecting apparatus of a wireless communication system in accordance with an embodiment of the present invention.

As shown in FIG. 2, the GCL sequence detecting apparatus according to the present embodiment includes an offset corrector 21, a signal processor 22, a differential encoder 23, a modified I/FDFT processor 24, and a real part selector 25, and a maximum detector 26.

Hereinafter, the constitutional elements will be described in more detail.

The offset corrector 21 corrects timing and frequency errors.

The signal processor 22 extracts a GCL sequence from the corrected signal outputted from the offset corrector 21. For example, in case of code division multiple access (CDMA) communication scheme, the dispreading operation is performed to extract the GCL sequence from the received signal. In case of orthogonal frequency division multiplexing (OFDM) communication scheme, the inverse fast fourier transform (IFFT) operation is performed to extract the GCL sequence from the received signal. Herein, the extracted GCL sequence includes noise.

The differential encoder 23 performs the differential encoding operation on the GCL sequence including noise using characteristics that the phase components, that is, a phase difference of GCL sequence, gradually increase as much as a predetermined constant amount.

The modified I/FDFT processor 24 changes the order of the encoded GCL sequence outputted from the differential encoder 23, or performs an modified I/FDFT operation on the encoded GCL sequence by changing an exponent function without changing the order of the GCL sequence. The N-point IDFT with the exponent function changed may be expressed as Eq. 10.

$$z(n) = \sum_{k=0}^{N-1} Z(k)\exp\left(\frac{\pm j2\pi n(k+1+q)}{N}\right) \quad \text{Eq. 10}$$

$$n = 0, 1, \ldots, N-1$$

In Eq. 10, N denotes the length of GCL sequence without partially expanded or shortened, and Z(k) denotes an output of the differential encoder. q denotes an integer. '+' in ±j2πn denotes FDFT, and '−' thereof denotes IDFT.

Using Eq. 10 instead of Eq. 8, also Eq. 9 may be transformed to Eq. 11.

$$z(u) \approx N \quad \text{Eq. 11}$$

Since Eq. 11 has only a real part, Eq. 11 has two advantages over Eq. 9 in a view of performance.

As the first advantage, signal to noise ratio (SNR) is improved, because only a real part is influenced by noise and an imaginary part is not used. If a general communication system uses Eq. 11, the noise of real part and imaginary part are added. Since the real value selector 25 obtains only real part from the output from the modified I/FDFT processor 24, the communication system does not receive the influence from the noise of the imaginary part. That is, Eq. 11 allows the communication system to receive less influence of noise compared to Eq. 9.

And the other advantage is based on a sign. Conventionally, a sign of a real part or an imaginary part is disappeared because the magnitude calculator 15 using Eq. 9 that squares the real part and the imaginary part and adds them. In the present embodiment, the real value selector 25 using Eq. 11 can advantageously consider a sign as well as a magnitude of real part of the output from the modified I/FDFT processor 24 except the imaginary part thereof. That is, Eq. 11 can express the sign of z(n). When the sign of z(n) is '−', it determines that the transmitted class is not u.

If Eq. 9 is used, it is impossible to determine whether the transmitting class is u or not on the basis of a sign. Therefore, the maximum detector 26 needs to find the maximum value among N magnitudes of the selected real parts having a positive sign of Z(n) in order to determine whether the GCL class is u or not.

Meanwhile, if the order of the GCL sequence changes in Eq. 10, it can be expressed as Eq. 12.

$$z(n) = \sum_{k=0}^{N-1} Z((k+N-1-q)\bmod N)\exp\left(\frac{\pm j2\pi nk}{N}\right), \quad \text{Eq. 12}$$

$$n = 0, 1, \ldots, N-1$$

Since the order of Z(k) is only difference between Eq. 12 and Eq. 8, the modified I/FDFT processor 24 changes the order of the output of the differential encoder 13 and performs the I/FDFT on the changed output. In Eq. 12, '+' in ±j2πn denotes FDFT, and '−' thereof denotes IDFT.

That is, Eq. 10 and Eq. 12 according to the present embodiment enable that the GCL sequence class u is detected with only a real part by changing the order of GCL sequence in Eq. 8 or changing the exponential function in Eq. 8.

Figure 3:
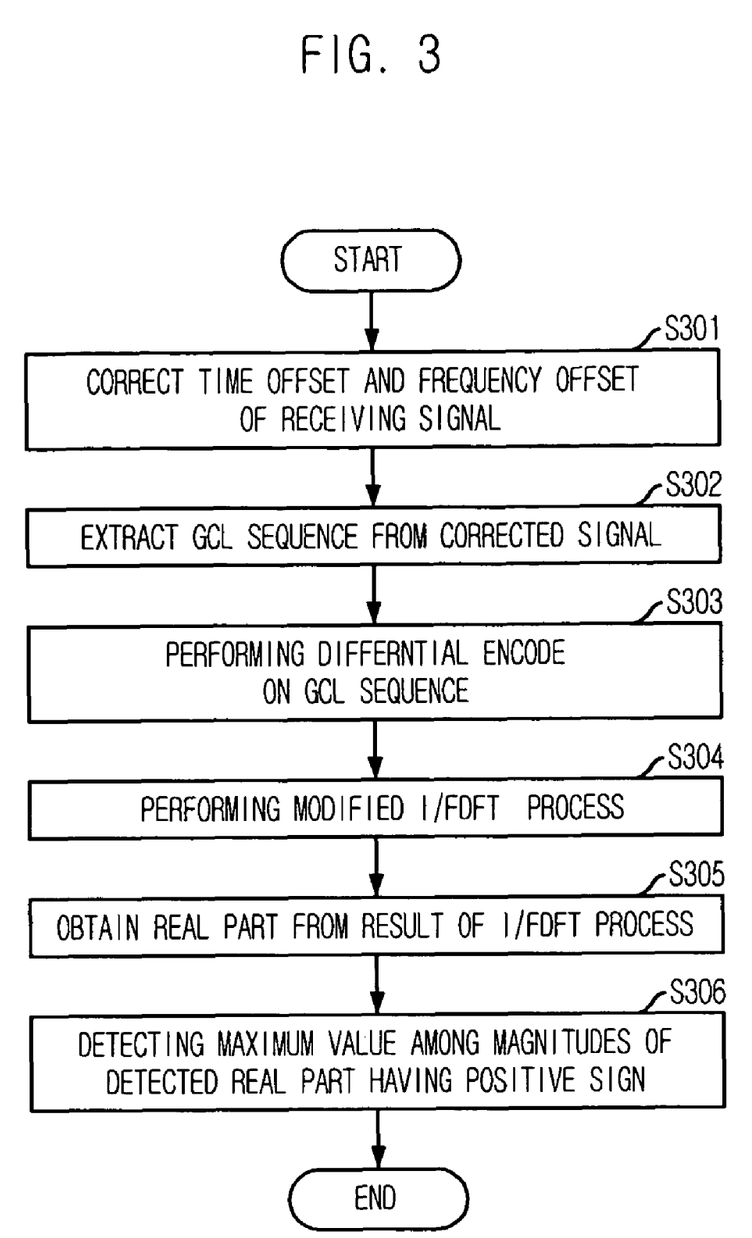
FIG. 3 is a flowchart illustrating a method of detecting a GCL sequence in a wireless communication system in accordance with an embodiment of the present invention.

FIG. 3 is a flowchart illustrating a method of detecting a GCL sequence in a wireless communication system in accordance with an embodiment of the present invention.

Referring to FIG. 3, a time offset and a frequency offset of a received signal are corrected at step S301.

Then, a GCL sequence is extracted from the corrected signal at step S302.

The extracted GCL sequence including noise is encoded based on a differential encoding scheme at step S303.

Afterward, the output of the encoded GCL sequence is transformed based on modified inverse/forward discrete fourier transform (I/FDFT) at step S304.

Then, the real part is selected from the modified I/FDFT transformed result at step S305.

Then, the maximum value is detected from the magnitudes of the selected real parts having the positive sign at step S306.

Figure 4:
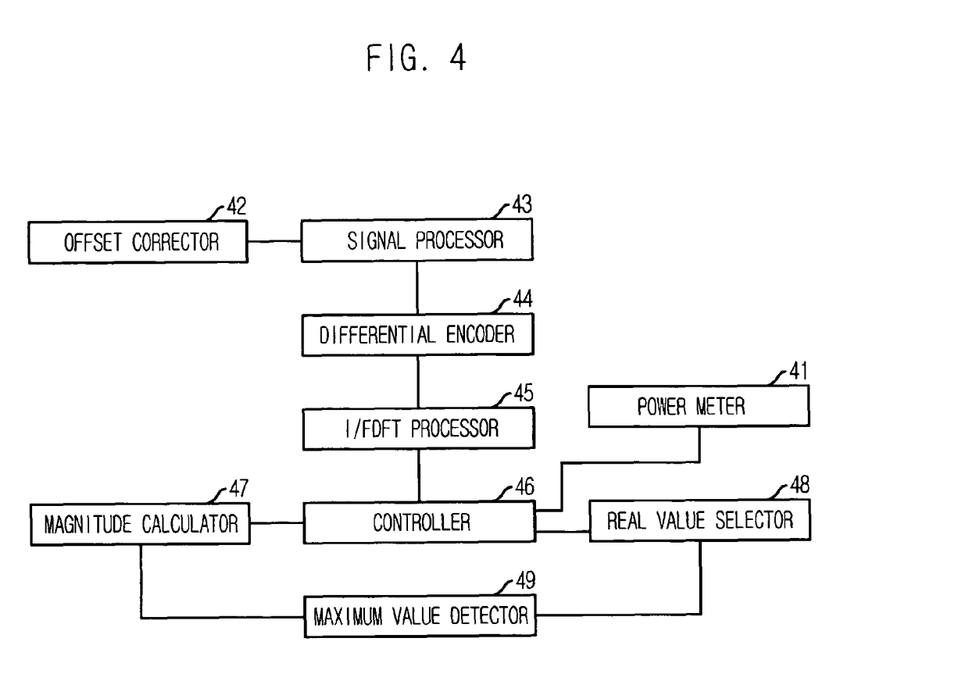
FIG. 4 is a block diagram illustrating a GCL sequence detecting apparatus of a wireless communication system in accordance with another embodiment of the present invention.

FIG. 4 is a block diagram illustrating a GCL sequence detecting apparatus of a wireless communication system in accordance with another embodiment of the present invention.

Referring to FIG. 4, the GCL sequence detecting apparatus according to the present embodiment includes a power measuring unit 41 for measuring a power of a received signal, an offset corrector 42 for correcting a time offset and a frequency offset of a received signal, a signal processor 43 for extracting a GCL sequence from the corrected signal from the offset corrector 42, a differential encoder 44 for performing a differential encoding on the extracted GCL sequence including noise from the corrected signal, an modified I/FDFT processor 45 for performing the modified I/FDFT operation enabling that the GCL sequence class u is detected with only a real part, a controller 46 for transfers an output value from the modified I/FDFT processor 45 to the real part selector 48 if the measured power is larger than a threshold, and transfers the output value from the modified I/FDFT processor 45 to the magnitude calculator 47 if the measured power is not larger than the threshold, a real part selector 48 for selecting a real part from the output value from the controller 46, a magnitude calculator 47 for calculating a magnitude by squaring the real part and the imaginary part of the output value from the controller 46, adding them, and calculating a root of the adding result, and a maximum value detector 49 for detecting a maximum value from magnitudes of the selected real parts having a positive sign from the real part selector 48, or detecting the maximum value from the calculated magnitudes from the magnitude calculator 47.

Figure 5:
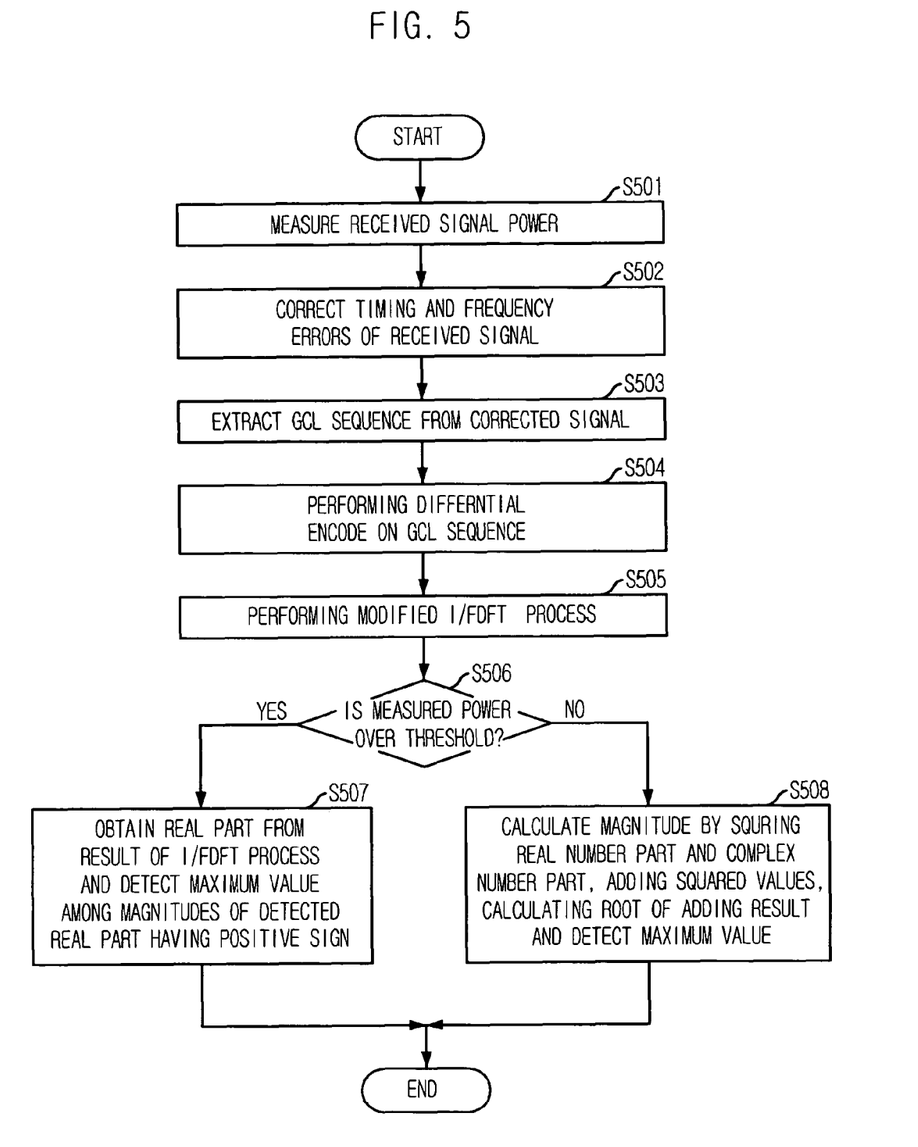
FIG. 5 is a flowchart illustrating a method of detecting a GCL sequence in a wireless communication system in accordance with another embodiment of the present invention.

FIG. 5 is a flowchart illustrating a method of detecting a GCL sequence in a wireless communication system in accordance with another embodiment of the present invention.

At first, a power of a received signal is measured at step S501.

Then, a time offset and a frequency offset of the received signal are corrected at step S502.

Afterward, the GCL sequence is extracted from the corrected signal at step S503.

After extracting, the extracted GCL sequence having noise is encoded through a different encoding scheme at step S504.

The output of the encoded GCL sequence is transformed based on modified inverse/forward discrete fourier transform (I/FDFT) at step S505.

Then, it determines whether the measured power is larger than a threshold or not at step S506.

If the measure power is larger than the threshold at step S506, a real part is selected from the result of performing the modified I/FDFT operation, and the maximum value is detected from the magnitudes of real part having a positive sign at step S507.

If the measured power is not larger than the threshold at step s506, magnitudes are calculated by squaring the real part and the imaginary part of the modified I/FDFT processing result, adding the squaring results, and calculating a root of the adding result, and the maximum value is detected therefrom at step s508.

As described above, a GCL sequence can be effectively detected with less computation amount and less influence of noise using a magnitude and a sign of a real part of the IDFT output except an imaginary part according to the present invention.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean Patent Application No. 2006-0095785, filed in the Korean Intellectual Property Office on Sep. 29, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for detecting a generalized chirp-like (GCL) sequence of a wireless communication system, said apparatus comprising:
   a modified inverse/forward discrete fourier transform (I/FDFT) processor for enabling a class u of the GCL sequence to be detected based on real parts of an output of the I/FDFT processor and without regard to imaginary parts of the output of the I/FDFT processor;
   a real value selector for selecting the real parts from the output of the I/FDFT processor; and
   a maximum value detector for detecting a maximum value among magnitudes of the selected real parts having a positive sign, said maximum value defining the class u of the GCL sequence.

2. The apparatus as recited in claim 1, wherein the modified I/FDFT processor performs an I/FDFT operation on the GCL sequence after changing the order of the GCL sequence using the following equation:

$$z(n) = \sum_{k=0}^{N-1} Z((k+N-1-q)_{mod\ N}) \exp\left(\frac{\pm j2\pi nk}{N}\right),$$

$$n = 0, 1, \ldots, N-1,$$

where
k denotes an index of entries forming the GCL sequence,
N denotes a length of the GCL sequence which is not partially extended or removed,
Z(k) denotes an input into the modified I/FDFT processor from a differential encoder,
q denotes an integer, and
'+' and in '−' in $\pm j2\pi nk$ denote FDFT and IDFT, respectively.

3. The apparatus as recited in claim 1, wherein the modified I/FDFT processor performs an I/FDFT operation on the GCL sequence using the following equation:

$$z(n) = \sum_{k=0}^{N-1} Z(k) \exp\left(\frac{\pm j2\pi n(k+1+q)}{N}\right),$$

$$n = 0, 1, \ldots, N-1,$$

where
k denotes an index of entries forming the GCL sequence,
q is an integer,
N denotes a length of the GCL sequence,
Z(k) denotes an input into the modified I/FDFT processor from a differential encoder, and
'+' and '−' in $\pm j2\pi nk$ denote FDFT and IDFT, respectively.

4. An apparatus for detecting a generalized chirp-like (GCL) sequence of a wireless communication system, said apparatus comprising:
   a power meter for measuring a power of a received signal;
   a modified inverse/forward discrete fourier transform (I/FDFT) processor for enabling a class u of the GCL sequence to be detected based on real parts of an output value of the I/FDFT processor and without regard to imaginary parts of the output value of the I/FDFT processor;

a controller for transferring the output value from the I/FDFT processor to a real value selector if the measured power is larger than a predetermined threshold, and transferring the output value from the I/FDFT processor to a magnitude calculator if the measure power is not larger than the predetermined threshold;

the real value selector for selecting the real parts from the output value from the controller;

the magnitude calculator for calculating a magnitude using both a real part and an imaginary part of the output value transferred from the controller; and a maximum value detector for detecting a maximum value among (i) magnitudes of the selected real parts having a positive sign from the real value selector or (ii) among the calculated magnitudes from the magnitude calculator, said maximum value defining the class u of the GCL sequence.

5. The apparatus as recited in claim 4, wherein the modified I/FDFT processor performs an I/FDFT operation on the GCL sequence after changing the order of the GCL sequence using the following equation:

$$z(n) = \sum_{k=0}^{N-1} Z((k+N-1-q)_{mod\ N}) \exp\left(\frac{\pm j2\pi nk}{N}\right),$$

$$n = 0, 1, \ldots, N-1,$$

where k denotes an index of entries forming the GCL sequence,

N denotes a length of the GCL sequence which is not partially extended or removed, Z(k) denotes an input into the modified I/FDFT processor from a differential encoder, q denotes an integer, and '+' and '−' in ±j2πnk denote FDFT and IDFT, respectively.

6. The apparatus as recited in claim 4, wherein the modified I/FDFT processor performs an I/FDFT operation on the GCL sequence using the following equation:

$$z(n) = \sum_{k=0}^{N-1} Z(k) \exp\left(\frac{\pm j2\pi n(k+1+q)}{N}\right),$$

$$n = 0, 1, \ldots, N-1,$$

where k denotes an index of entries forming the GCL sequence, q is an integer,

N denotes a length of the GCL sequence,

Z(k) denotes an input into the modified I/FDFT processor from a differential encoder, and '+' and '−' in ±j2πnk denote FDFT and IDFT, respectively.

7. A method for detecting a generalized chirp-like (GCL) sequence of a wireless communication system, said method comprising:

a) performing an I/FDFT operation on the GCL sequence to enable a class u of the GCL sequence to be detected based on real parts of a result of the I/FDFT operation and without regard to imaginary parts of the result of the I/FDFT operation;

b) selecting the real parts from the result of the I/FDFT operation; and c) detecting a maximum value among magnitudes of the selected real parts having a positive sign, said maximum value defining the class u of the GCL sequence.

8. The method as recited in claim 7, wherein the I/FDFT operation is performed on the GCL sequence after changing the order of the GCL sequence using the following equation:

$$z(n) = \sum_{k=0}^{N-1} Z((k+N-1-q)_{mod\ N}) \exp\left(\frac{\pm j2\pi nk}{N}\right),$$

$$n = 0, 1, \ldots, N-1,$$

where k denotes an index of entries forming the GCL sequence,

N denotes a length of the GCL sequence which is not partially extended or removed, Z(k) denotes an input for the I/FDFT operation from a differential encoder, q denotes an integer, and '+' and '−' in ±j2πnk denote FDFT and IDFT, respectively.

9. The method as recited in claim 7, wherein the I/FDFT operation is performed using the following equation:

$$z(n) = \sum_{k=0}^{N-1} Z(k) \exp\left(\frac{\pm j2\pi n(k+1+q)}{N}\right),$$

$$n = 0, 1, \ldots, N-1,$$

where k denotes an index of entries forming the GCL sequence, q is an integer,

N denotes a length of the GCL sequence,

Z(k) denotes an input for the I/FDFT operation from output of a differential decoder encoder, and '+' and '−' in ±j2πnk denote FDFT and IDFT, respectively.

10. A method for detecting a generalized chirp-like (GCL) sequence of a wireless communication system, said method comprising:

a) measuring a power of a received signal;

b) performing an I/FDFT operation on the GCL sequence to enable a class u of the GCL sequence to be detected based on real parts of a result of the I/FDFT operation and without regard to imaginary parts of the result of the I/FDFT operation:

c) if the measured power is larger than a predetermined threshold, selecting the real parts from the result of the I/FDFT operation and detecting a maximum value among magnitudes of the selected real parts having a positive sign, said maximum value defining the class u of the GCL sequence; and d) if the measured power is not larger than the predetermined threshold, calculating a magnitude using both a real part and an imaginary part of the result of the I/FDFT operation, and detecting a maximum value among the calculated magnitudes, said maximum value defining the class u of the GCL sequence.

11. The method as recited in claim 10, wherein the I/FDFT operation is performed on the GCL sequence after changing the order of the GCL sequence using the following equation:

$$z(n) = \sum_{k=0}^{N-1} Z((k+N-1-q)_{mod N}) \exp\left(\frac{\pm j2\pi nk}{N}\right), n = 0, 1, \ldots, N-1,$$

where k denotes an index of entries forming the GCL sequence,

N denotes a length of the GCL sequence which is not partially extended or removed, Z(k) denotes an input for the I/FDFT operation from a differential encoder, q denotes an integer, and '+' and '−' in ±j2πnk denote FDFT and IDFT, respectively.

12. The method as recited in claim 10, wherein the I/FDFT operation is performed using the following equation:

$$z(n) = \sum_{k=0}^{N-1} Z(k) \exp\left(\frac{\pm j2\pi n(k+1+q)}{N}\right),$$

$$n = 0, 1, \ldots, N-1,$$

where k denotes an index of entries forming the GCL sequence, q is an integer,

N denotes a length of the GCL sequence,

Z(k) denotes an input for the I/FDFT operation from a differential encoder, and

'+' and '−' in ±j2πnk denote FDFT and IDFT, respectively.

* * * * *